United States Patent
Homier et al.

(10) Patent No.: US 9,836,787 B1
(45) Date of Patent: Dec. 5, 2017

(54) METHOD AND SYSTEM FOR SECURE SYNDICATED BALANCE DISPLAY

(75) Inventors: Matthew James Homier, San Francisco, CA (US); Patricia Powell, Oakland, CA (US)

(73) Assignee: Intuit Inc., Mountain View, CA (US)

( * ) Notice: Subject to any disclaimer, the term of this patent is extended or adjusted under 35 U.S.C. 154(b) by 684 days.

(21) Appl. No.: 13/274,153

(22) Filed: Oct. 14, 2011

(51) Int. Cl.
*G06Q 40/00* (2012.01)
*G06Q 40/02* (2012.01)

(52) U.S. Cl.
CPC .................................. *G06Q 40/02* (2013.01)

(58) Field of Classification Search
None
See application file for complete search history.

(56) References Cited

U.S. PATENT DOCUMENTS

| | | | |
|---|---|---|---|
| 2009/0081989 A1* | 3/2009 | Wuhrer | G06Q 20/10 455/406 |
| 2010/0100424 A1* | 4/2010 | Buchanan et al. | 705/10 |
| 2010/0114724 A1* | 5/2010 | Ghosh | G06Q 20/20 705/24 |
| 2011/0082772 A1* | 4/2011 | Hirson | G06Q 20/32 705/27.1 |
| 2012/0030043 A1* | 2/2012 | Ross | G06Q 20/20 705/16 |

* cited by examiner

*Primary Examiner* — Ryan D Donlon
*Assistant Examiner* — Irene Kang
(74) *Attorney, Agent, or Firm* — Hawley Troxell Ennis & Hawley LLP; Philip McKay

(57) ABSTRACT

One or more financial accounts associated with a user are designated for balance monitoring and balance display. Balance increments are then defined and a unique balance indicator image, symbol, or display, is associated with each defined balance increment. One or more websites, and/or applications, are then designated to display the balance indicator images, symbols, or displays, and whenever one of the designated websites or applications is accessed, data indicating a current balance in the designated one or more financial accounts is obtained. The current balance amount is then encoded using the appropriate balance indicator image, symbol, or display, and the appropriate balance indicator image, symbol, or display, is displayed on a display device associated with the user computing system as part of, on, in, or through, the accessed designated website or application.

20 Claims, 2 Drawing Sheets

METHOD AND SYSTEM FOR SECURE SYNDICATED BALANCE DISPLAY

BACKGROUND

Until relatively recently, consumers desiring to determine how much money they had available to make purchases simply had to check the contents of their wallets. However, with the emergence, and dominance, of electronic payment methods and accounts such as, but not limited to, credit cards, debit cards, and/or ATM cards, keeping track of available funds has become significantly more complicated.

For instance, a consumer considering a purchase through a website, or while in a store, who desires to use an electronic payment method must currently either try to remember, and/or calculate, their balance in the account associated with the electronic payment method, or, for more certainty, must postpone the purchase while they utilize one or more remote means, such as logging onto separate websites associated with one or more financial institutions, and/or calling telephone numbers associated with their credit and debit cards, and/or utilizing physical locations such as ATMs, to check their balance in the account associated with the electronic payment method the consumer desires to use.

There is little question that the various electronic payment methods and accounts available today are far more convenient, and offer considerably more security, than carrying around large amounts of cash. However, the current need to obtain balance information in actions, and/or from sources, that are separate and distinct from the purchase transactions often represents a significant inconvenience to the consumer. For example, the consumer may desire to make a purchase immediately and/or without having to either recall or check their account balances. In addition, the consumer may be using a mobile computing system so that logging into a separate website may not be convenient, an option, or even safe.

The current situation discussed above can represent a significant barrier to some consumer purchases. Consequently, the current situation can be problematic for both consumers, who would like to make purchases easily and be confident they can afford and/or pay for the purchases, as well as merchants, who would like to encourage purchases. What is needed is a method and system for allowing consumers access to information regarding their account balances that is simple to use but still provides the consumer with acceptable levels of privacy and security.

SUMMARY

In accordance with one embodiment, a method and system for secure syndicated balance display includes a process for secure syndicated balance display whereby, in one embodiment, one or more financial accounts associated with a user are designated for balance monitoring and balance display. In one embodiment, balance increments are then defined. A unique balance indicator image, symbol, or display, is then selected and/or associated with each defined balance increment. In one embodiment, one or more websites, and/or applications, are designated to receive data representing the balance indicator images, symbols, or displays, i.e., to display the balance indicator images, symbols, or displays. In one embodiment, when one of the designated websites or applications is accessed by the user via a user computing system, data indicating a current balance in the designated one or more financial accounts is obtained. In one embodiment, the current balance amount is then encoded using the appropriate balance indicator image, symbol, or display, which is associated with the defined balance increment that includes the actual current account balance amount. In one embodiment, the appropriate balance indicator image, symbol, or display, is then displayed on a display device associated with the user computing system as part of, on, in, or through, the accessed designated website or application.

Using one embodiment of the method and system for secure syndicated balance display, as discussed herein, the user is provided an encoded and visual representation of their current balance in one or more designated accounts at the time the user is contemplating, or making, a purchase, and/or in the actual website interface through which the user is contemplating making, or is making, the purchase. Consequently, using the method and system for secure syndicated balance display, as discussed herein, a user can elect to make a purchase with the confidence that the user can afford the purchase, and/or has the funds available to pay for the purchase in selected accounts.

In addition, using one embodiment of the method and system for secure syndicated balance display, as discussed herein, the user's actual balance information is encoded by way of the appropriate balance indicator image, symbol, or display. Consequently, the user's actual balance amounts are neither directly displayed to the user on a display device, a device that potentially can be viewed/accessed by others, nor is the user's actual balance amount data actually provided to the designated websites and/or applications through which the appropriate balance indicator image, symbol, or display, is displayed. Therefore, using the method and system for secure syndicated balance display, as discussed herein, the user is provided a simple and effective means for determining their account balances without sacrificing their privacy or security. As a result, a significant barrier to some consumer purchases is eliminated and both consumers, who would like to make purchases easily and be confident they can afford and/or pay for the purchases, and merchants, who would like to encourage purchases, are benefited.

As discussed in more detail below, using the below embodiments, with little or no modification and/or user/consumer input, there is considerable flexibility, adaptability, and opportunity for customization to meet the specific needs of various users/consumers under numerous circumstances.

Figure 1:
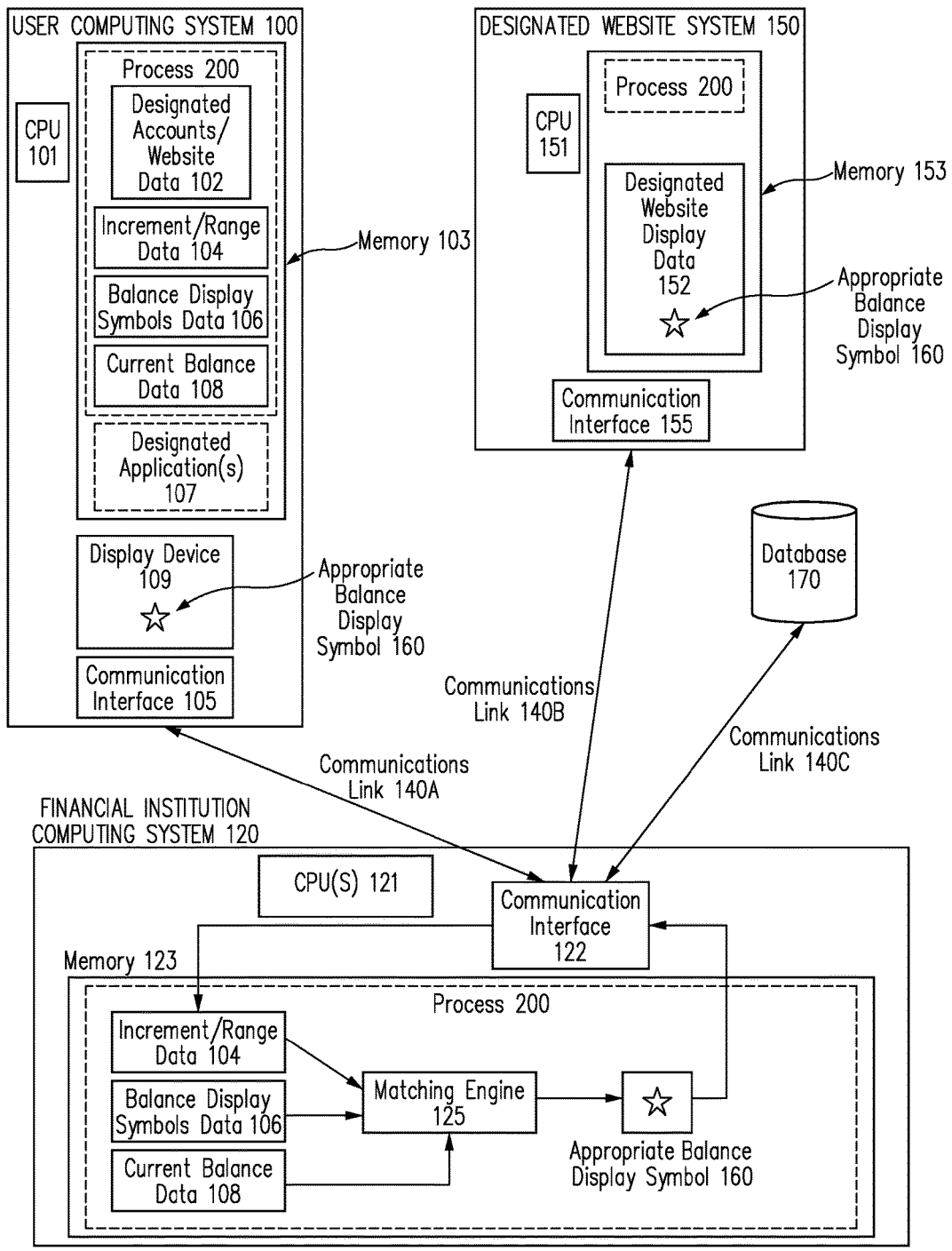
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for secure syndicated balance display includes a process for secure syndicated balance display.

In one embodiment, at least part of the process for secure syndicated balance display is implemented on a user computing system and/or a user mobile computing system.

Herein the term "computing system" includes, but is not limited to, any computing system known in the art at the time of filing, and/or as developed after the time of filing, such as, but not limited to: a mobile computing system; a desktop computing system; a laptop computing system; a notebook computing system; a workstation; a two-way pager; a cellular telephone; a smart phone; a digital wireless telephone; a Personal Digital Assistant (PDA); a server computer; an Internet appliance, and/or any other device, or any desired combination of these devices, that includes components that can execute all, or part, of a process for secure syndicated balance display in accordance with at least one of the embodiments as discussed herein, and/or as known in the art at the time of filing, and/or as developed after the time of filing.

Herein, the term "mobile computing system" includes, but not limited to: a mobile phone; a smart phone; an internet appliance; any SMS capable system; or any other mobile computing system as discussed herein, and/or as known in the art at the time of filing, and/or as developed after the time of filing.

In one embodiment, at least part of the process for secure syndicated balance display is, or is associated with, one or more applications and/or data management systems implemented on one or more computing systems accessible by the user.

Herein, the term "application" includes, but is not limited to, any computing system implemented, and/or online, systems, packages, programs, and/or modules, implemented in whole, or in part, by any computing system and/or website as discussed herein, and/or as known in the art/available at the time of filing, and/or as developed/made available after the time of filing. Specific examples of applications include, but are not limited to, mobile applications, social media applications, data management systems, operating systems, interface systems, and/or financial management systems.

As discussed in more detail below, in one embodiment, the process for secure syndicated balance display is part of, accessed through, or otherwise associated with, one or more electronic payment systems such as PayPal™, or various on-line payment features provided by various financial institutions.

In various embodiments, the process for secure syndicated balance display is a "stand alone" system, package, program, module, or application.

In one embodiment, one or more financial accounts associated with a user are designated for balance monitoring and balance display using the process for secure syndicated balance display.

In one embodiment, the one or more financial accounts associated with the user can be any one or more of, but not limited to: debit card accounts; credit card accounts; checking accounts; savings accounts; and or any other account, or account type, as discussed herein, and/or as known in the art/available at the time of filing, and/or as developed/made available after the time of filing.

In one embodiment, the one or more financial accounts associated with the user are designated by the user via a user interface display displayed on a display device associated with one or more computing systems, and one or more user interface devices, such as a keyboard, mouse, touchscreen, touchpad, voice-recognition system, or any other device or mechanism for providing user input and converting the user input into computing system instructions and/or actions.

In one embodiment, the one or more financial accounts associated with the user are designated through the process for secure syndicated balance display. In one embodiment, the one or more financial accounts associated with user are designated through one or more websites associated with one or more financial institutions. In one embodiment, the financial accounts associated with the user are designated through one or more designated applications, such as, but not limited to, mobile computing system applications.

In one embodiment, one or more balance increments are then defined. In one embodiment, the one or more balance increments are selected to define specified balance ranges. As a specific example, in one embodiment the one or more balance increments are selected to define ranges of $0-$500, $501-$750, $751-$1000, and balances over $1000. In various embodiments, the balance ranges defined by the balance increments are to be applied to a single financial account designated by the user as discussed above. In other embodiments, the balance ranges defined by the balance increments are applied to the combined balances of two or more financial accounts designated by the user as discussed above.

In one embodiment, the one or more balance increments are automatically assigned/defined by the process for secure syndicated balance display.

In one embodiment, the one or more balance increments are defined by the user via a user interface display displayed on a display device associated with one or more computing systems, and one or more user interface devices, such as a keyboard, mouse, touchscreen, touchpad, voice-recognition system, or any other device or mechanism for providing user input and converting the user input into computing system instructions and/or actions.

In one embodiment, the one or more balance increments are defined through the process for secure syndicated balance display. In one embodiment, the one or more balance increments are defined through one or more websites associated with one or more financial institutions. In one embodiment the one or more balance increments are defined through one or more designated applications, such as, but not limited to, mobile computing system applications.

In one embodiment, a unique balance indicator image, symbol, or display, is associated with each defined balance increment/range. In one embodiment, the unique balance indicator images, symbols, or displays, are chosen/selected by the user, and or the process for secure syndicated balance display, such that a different/unique balance indicator image, symbol, or display, is associated with, or linked to, each defined balance increment/range so that when an actual financial account(s) balance amount is present/detected that is within a specific balance increment/range, a specific and unique balance indicator image, symbol, or display, is indicated and displayed. As discussed below, in this way the actual financial account(s) balance amount is encoded using the specific and unique balance indicator images, symbols, or displays.

In various embodiments, the balance indicator images, symbols, or displays, include, but are not limited to, any singular, combination, or multi-symbol graphical display such as, but not limited to: graphical caricatures, letters, stars, codes, thermometers, sliding scales, any animated graphical representation, or any partially filed display, or symbol, or outline thereof, and/or any specified color, shape, and/or size, of these symbols or graphical displays.

For instance, as one example, balance indicator images, symbols, or displays, having a different number of the same elements are assigned to each defined balance increment/range, such as one or more stars or dollar signs.

As another specific example, a balance indicator image, symbol, or display, of a different type is assigned to each defined balance increment/range such as a different type of animal, or object, or other graphic image.

As another specific example, a balance indicator image, symbol, or display, of a different size is assigned to each defined balance increment/range, such as a different size animal, symbol, wallet graphic, bank graphic, or any other graphic image.

As another example, a balance indicator image, symbol, or display, of a different color is assigned to each defined balance increment/range, such as a different color animal, symbol, wallet, dollar symbol, bank symbol or any other graphic image.

In various embodiments the balance indicator images, symbols, or displays, can include, but are not limited to, background displays of various types and/or colors that are displayed on a user interface screen of a display device associated with a user computing system. For instance, as one specific example, in one embodiment, a different color background display, or a different background scene, is assigned to each balance increment.

In various embodiments, the balance indicator images, symbols, or displays, include, but are not limited to, an animated balance indicator image, symbol, or display. In various embodiments, an animated balance indicator image, symbol, or display, performing a different motion, or doing a different task, or as otherwise differentially animated, is assigned to each defined balance increment/range.

In various embodiments, the balance indicator images, symbols, or displays, include, but are not limited to, caricatures or avatar displays, or symbols. In various embodiments, a caricature or avatar of different appearance, or animated motion, is assigned to each defined balance increment/range. For instance, as one specific illustrative example, a caricature or avatar having a different body type, such as fatter or thinner, or performing a different motion, is assigned to each defined balance increment/range.

In various embodiments, virtually any discrete displays, graphics, symbol, or symbols, or any background display or color scheme may be used as balance indicator images, symbols, or displays.

As an specific example made for illustrative purposes, a user can user set balance increments such as "over $1500", "over $500", "over $250", and "under $250", and associate these balance increments with "blue", "green", "yellow", "red" balance indicator images, symbols, or displays respectively.

As an specific example made for illustrative purposes, a user can user set balance increments such as "over $100", "over $500", "over $1000", and "under $100", and associate these balance increments with a "tiger", "lion", "panther", "bobcat" balance indicator images, symbols, or displays, respectively.

In various embodiments, the balance indicator images, symbols, or displays can be as abstract and/or cryptic as the user desires. However, the more logical the link between the balance increments and the balance indicator images, symbols, or displays, the easier they will be to decipher.

In one embodiment, the unique balance indicator images, symbols, or displays, are provided and assigned to the balance increments by the user.

In one embodiment, a listing of unique balance indicator images, symbols, or displays, are provided to the user by the process for secure syndicated balance display and the user selects and assigns the desired unique balance indicator images, symbols, or displays to the balance increments.

In one embodiment, the unique balance indicator images, symbols, or displays, are provided and assigned to the balance increments by the user through the process for secure syndicated balance display via a user interface display displayed on a display device associated with one or more computing systems, and one or more user interface devices, such as a keyboard, mouse, touchscreen, touchpad, voice-recognition system, or any other device or mechanism for providing user input and converting the user input into computing system instructions and/or actions.

In one embodiment, the unique balance indicator images, symbols, or displays, are provided and assigned to the balance increments by the user through one or more websites associated with one or more financial institutions.

In one embodiment the unique balance indicator images, symbols, or displays, are selected through one or more designated applications, such as, but not limited to, mobile computing system applications.

In one embodiment, one or more websites, and/or applications, are designated to receive data representing the balance indicator images, symbols, or displays, i.e., to display the balance indicator images, symbols, or displays.

In one embodiment, the one or more websites, and/or applications, designated to receive data representing the balance indicator images, symbols, or displays, can be any one or more of, but not limited to: websites, and/or applications, associated with one or more providers of products and services; websites, and/or applications, associated with online auctions; websites, and/or applications, through which any products and/or service can be purchased; mobile applications; any applications associated with screen displays, background displays, and/or other displays generated and/or shown on a computing system; and/or any other websites, and/or applications, of interest to the user and designated by the user and/or the process for secure syndicated balance display.

In one embodiment, once one or more websites, and/or applications, are designated to receive data representing the balance indicator images, symbols, or displays, a Personal Identification Number (PIN) is assigned to the user which is unique to the user.

In one embodiment, data indicating the designated financial accounts, data indicating the balance increments/ranges and the balance indicator images, symbols, or displays, associated/assigned to the balance increments/ranges, and data indicating the one or more websites, and/or applications, designated to receive data representing the balance indicator images, symbols, or displays, is linked and stored.

In one embodiment, the data is stored/saved in a database or any computing system, as discussed herein, and/or as known in the art/available at the time of filing, and/or as developed/made available after the time of filing.

Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as defined herein, known at the time of filing, or as developed thereafter.

For instance, in one embodiment, the data is saved/stored in whole, or in part, in a memory system, or in a cache memory, or in any main memory or mass memory, associated with any computing system as discussed herein, and/or as known/available in the art at the time of filing, and/or as developed/made available after the time of filing. In one embodiment, the data, in whole, or in part, is stored in any computing system and/or server system, or other device, in another location, or on/in a computer readable medium, and/or any other computer program product, as defined herein. In one embodiment, the data, in whole, or in part, is stored on a webpage, in a web-based system, or on a public network such as the Internet.

In some embodiments, the data, stored as described above, is maintained, in whole, or in part, by: the process for secure syndicated balance display, and/or a provider of the process for secure syndicated balance display; a data management system, and/or a provider of a data management system; a financial institution; a social media system/network, and/or a provider of a social media system/network; a third party data storage institution; any third party service or institution; and/or any other parties. In some of these embodiments, access to the data is then provided to the process for secure syndicated balance display by providing access to the data and/or providing the data on a computer program product.

In one embodiment, when one of the designated websites or applications is accessed by the user, data indicating a current balance in the designated one or more financial accounts is obtained.

In one embodiment, the data indicating the current balance in the designated one or more financial accounts is obtained from one or more websites, and/or databases, associated with the one or more financial accounts. In one embodiment, the data indicating the current balance in the designated one or more financial accounts is obtained from one or more third party sources, such as a financial management system used by, or associated with the user.

Herein, the term data management system includes, but is not limited to: any of the following: computing system implemented, and/or online, personal and/or business receipt management systems, packages, programs, modules, or applications; computing system implemented, and/or online, personal and/or business financial management systems, packages, programs, modules, or applications; computing system implemented, and/or online, personal and/or business tax preparation systems, packages, programs, modules, or applications; computing system implemented, and/or online, personal and/or business accounting and/or invoicing systems, packages, programs, modules, or applications; computing system implemented, and/or online, bookkeeping systems, packages, programs, modules, or applications; and various other personal and/or business electronic data management systems, packages, programs, modules, or applications, whether known at the time of filling or as developed later.

Specific examples of currently available data management systems include, but are not limited to: Mint™, available from Intuit, Inc. of Mountain View, Calif.; Quicken™, available from Intuit, Inc. of Mountain View, Calif.; Quicken On-line™, available from Intuit, Inc. of Mountain View, Calif.; QuickReceipts™, available from Intuit, Inc. of Mountain View, Calif.; QuickBooks™, available from Intuit, Inc. of Mountain View, Calif.; QuickBooks On-line™, available from Intuit, Inc. of Mountain View, Calif.; Quicken Health Expense Manager™, available from Intuit, Inc. of Mountain View, Calif.; Microsoft Money™, previously available from Microsoft, Inc. of Redmond, Wash.; and/or various other data management applications discussed herein, and/or known to those of skill in the art at the time of filing, and/or as developed after the time of filing.

In one embodiment, the data indicating the balance in the designated one or more financial accounts is the most current available balance data, i.e., data indicating the balance in the designated one or more financial accounts that has most recently been received, but is not necessarily real-time data.

In one embodiment the data indicating the balance in multiple designated financial accounts is obtained, and combined, to provide a combined most current available balance data for the designated financial accounts.

In one embodiment, the current balance amount data is then encoded using the appropriate balance indicator image, symbol, or display, which is associated with the defined balance increment that includes the actual current account balance amount.

In one embodiment the appropriate balance indicator image, symbol, or display, is then displayed on a display device associated with the user computing system as part of, on, in, or through, the accessed designated website or application.

In various embodiments, the appropriate balance indicator image, symbol, or display, is displayed on an "on demand" basis, and/or only when a designated website or application is accessed. In other embodiments, the appropriate balance indicator image, symbol, or display, is displayed automatically on either a periodic or continuous basis.

In one embodiment, when one of the designated websites or applications is accessed by the user, the user is requested to provide the user's PIN. In one embodiment, the accessed designated website or application then sends a request to a central server, or other computing system, and retrieves the appropriate balance indicator image, symbol, or display, that is associated with the defined balance increment that includes the actual current account balance amount. Consequently, in one embodiment, the accessed designated website or application provider never receives data indicating the actual current account balance amount nor the financial account associated with the balance indicator image, symbol, or display provided. However, the appropriate balance indicator image, symbol, or display is provided for display on a designated screen, such as, but not limited to, a checkout screen, cart screen, or other user interface display.

In one embodiment, when one of the designated applications is an application implemented, at least in part, on a computing system, and the application is accessed by the user, the balance indicator image, symbol, or display, that is associated with the defined balance increment that includes the actual current account balance amount is displayed in a updated background display on the computing system.

In one embodiment, when one of the designated applications is a mobile application implemented, at least in part, on a mobile computing system, when the mobile application is accessed by the user, the balance indicator image, symbol, or display, that is associated with the defined balance increment that includes the actual current account balance amount is displayed in a updated background display background displayed on the mobile computing system.

Hardware System Architecture

FIG. 1 is a block diagram of an exemplary hardware architecture for implementing one embodiment of a system and method secure syndicated balance display, such as exemplary process 200 discussed herein, that includes: a user computing system 100, e.g., a first computing system; a designated website system 150, e.g., a second computing system; a financial institution computing system 120, e.g., a third computing system or server system; a database 170; a communications link 140A, e.g., a first communications link; a communications link 140B, e.g., a second communications link; and communications link 140C, e.g., a third communications link.

As seen in FIG. 1, user computing system 100 typically includes a central processing unit (CPU) 101, a communications interface 105, a memory system 103, and a display device 109.

In one embodiment, memory system 103 includes all, or part of, a process for secure syndicated balance display 200, shown as process 200 in FIG. 1.

In one embodiment, memory system 103 includes all, or part of, designated accounts/website data 102 that includes data, processes, and/or procedures for identifying, accessing, and/or otherwise associated with, one or more designated financial accounts associated with the user to be monitored using process for secure syndicated balance display 200.

In one embodiment, the one or more financial accounts associated with the user of designated accounts/website data 102 can be any one or more of, but not limited to: debit card accounts; credit card accounts; checking accounts; savings accounts; and or any other account, or account type, as discussed herein, and/or as known in the art/available at the time of filing, and/or as developed/made available after the time of filing.

In one embodiment, designated accounts/website data 102 includes data, processes, and/or procedures for identifying, accessing, and/or associated with, one or more websites, and/or applications, that are designated to receive data representing the balance indicator images, symbols, or displays, i.e., to display the balance indicator images, symbols, or displays.

In one embodiment, memory system 103 includes all, or part of, increment/range data 104 including data, processes and/or procedures for defining one or more balance increments. In one embodiment, the one or more balance increments are selected to define specified balance ranges. As a specific example, in one embodiment the one or more balance increments are selected to define ranges of $0-$500, $501-$750, $751-$1000, and balances over $1000. In various embodiments, the balance ranges defined by the balance increments are to be applied to a single financial account designated by the user as discussed above. In other embodiments, the balance ranges defined by the balance increments are applied to the combined balances of two or more financial accounts designated by the user as discussed above.

In one embodiment, memory system 103 includes all, or part of, balance display symbols data 106 including data, processes, and/or procedures for associating a unique balance indicator image, symbol, or display, with each defined balance increment/range of increment/range data 104.

In one embodiment, the unique balance indicator images, symbols, or displays, of balance display symbols data 106 are chosen/selected by the user, and or the process for secure syndicated balance display, such that a different/unique balance indicator image, symbol, or display, is associated with, or linked to, each defined balance increment/range so that when an actual financial account(s) balance amount is present/detected that is within a specific balance increment/range, a specific and unique balance indicator image, symbol, or display, is indicated and displayed. As discussed below, in this way the actual financial account(s) balance amount is encoded using the specific and unique balance indicator images, symbols, or displays of balance display symbols data 106.

In one embodiment, memory system 103 includes all, or part of, current balance data 108 including data, processes, and/or procedures for obtaining, and processing data indicating the current balance in the designated one or more financial accounts of designated accounts/website data 102. In one embodiment, the data indicating the current balance in the designated one or more financial accounts is obtained from one or more third party sources, such as a financial management system used by, or associated with the user.

In one embodiment, memory system 103 includes all, or part of, designated applications 107. Herein, the term "application" includes, but is not limited to, any computing system implemented, and/or online, systems, packages, programs, and/or modules, implemented in whole, or in part, by any computing system and/or website as discussed herein, and/or or as known in the art/available at the time of filing, and/or as developed/made available after the time of filing. Specific examples of applications include, but are not limited to, mobile applications, social media applications, data management systems, operating systems, interface systems, and/or financial management systems.

As also shown in FIG. 1, display device 109 includes appropriate balance display symbol 160.

In one embodiment, the current balance amount data of current balance data 108 is encoded using the appropriate balance indicator image, symbol, or display, of balance display symbols data 106, which is associated with the defined balance increment of increment/range data 104 that includes the actual current account balance amount of current balance data 108.

In one embodiment appropriate balance display symbol 160 is then displayed on a display device 109 associated with user computing system 100 as part of, on, in, or through, one or more display screens associated with one or more applications of designated applications 107, and/or accessed through one or more designated websites of designated accounts/website data 102.

In various embodiments, appropriate balance display symbol 160 is displayed on an "on demand" basis, and/or only when a designated website or application is accessed. In other embodiments, appropriate balance display symbol 160 is displayed automatically on either a periodic or continuous basis.

In one embodiment, user computing system 100 is any computing system discussed herein, and/or as known in the art at the time of filing, and/or as developed after the time of filing that includes components that can execute all, or part, of process for secure syndicated balance display 200 in accordance with at least one of the embodiments as described herein.

Herein the term "computing system" includes, but is not limited to, any computing system known in the art at the time of filing, and/or as developed after the time of filing, such as, but not limited to: a mobile computing system; a desktop computing system; a laptop computing system; a notebook computing system; a workstation; a two-way pager; a cellular telephone; a smart phone; a digital wireless telephone; a Personal Digital Assistant (PDA); a server computer; an Internet appliance, and/or any other device, or any desired combination of these devices, that includes components that can execute all, or part, of a process for secure syndicated balance display in accordance with at least one of the embodiments as discussed herein, and/or as known in the art at the time of filing, and/or as developed after the time of filing.

In one embodiment, user computing system 100 is a mobile computing system. Herein, the term "mobile computing system" includes, but not limited to: a mobile phone; a smart phone; an internet appliance; any SMS capable system; or any other mobile computing system as discussed herein, and/or as known in the art at the time of filing, and/or as developed after the time of filing.

In various embodiments, user computing system 100 may further include standard user interface devices such as a keyboard (not shown), a mouse (not shown), a printer (not shown), and a display device (not shown), as well as, one or more standard input/output (I/O) devices (not shown), such as a compact disk (CD) or Digital Video Disc (DVD) drive, floppy disk drive, or other device capable of inputting data to, and outputting data from, user computing system 100, whether available or known at the time of filing or as later developed.

In one embodiment, process for secure syndicated balance display 200 is entered, in whole, or in part, into user computing system 100 via an I/O device (not shown), such as from a CD, DVD, floppy disk, portable hard drive, memory stick, download site, or other medium and/or computer program product as defined herein.

As also seen in FIG. 1, designated website system 150 typically includes a central processing unit (CPU) 151, a communications interface 155, and a memory system 153. In one embodiment, memory system 153 includes all, or part of, process for secure syndicated balance display 200, shown as process 200 in FIG. 1.

In one embodiment, memory system 153 includes all, or part of, designated website display data 152 that includes data, processes and/or procedures for generating and displaying one or more interface displays associated with the website provided thru designated website system 150.

In one embodiment, designated website display data 152 includes appropriate balance display symbol 160.

In one embodiment, when the website provided thru designated website system 150 is accessed by user computing system 100, the current balance amount data of current balance data 108 is encoded using the appropriate balance indicator image, symbol, or display, of balance display symbols data 106, which is associated with the defined balance increment of increment/range data 104 that includes the actual current account balance amount of current balance data 108.

In one embodiment appropriate balance display symbol 160 is then included in designated website display data 152 and displayed as part of one or more interface displays associated with the website provided thru designated website system 150.

In one embodiment the one or more interface displays and/or appropriate balance display symbol 160, is then displayed on a display device 109 associated with user computing system 100.

In various embodiments, appropriate balance display symbol 160 is displayed on an "on demand" basis, and/or only when a designated website or application is accessed. In other embodiments, appropriate balance display symbol 160 is displayed automatically on either a periodic or continuous basis.

In one embodiment, the provider of designated website system 150 never receives data indicating the actual current account balance amount or the financial account associated with the balance indicator image, symbol, or display provided. However, the appropriate balance indicator image, symbol, or display is provided for display on a designated screen, such as, but not limited to, a checkout screen, cart screen, or other user interface display.

In one embodiment, designated website system 150 is any computing system discussed herein, and/or as known in the art at the time of filing, and/or as developed after the time of filing that includes components that can execute all, or part, of process for secure syndicated balance display 200 in accordance with at least one of the embodiments as described herein.

In various embodiments, designated website system 150 may further include standard user interface devices such as a keyboard (not shown), a mouse (not shown), a printer (not shown), and a display device (not shown), as well as, one or more standard input/output (I/O) devices (not shown), such as a compact disk (CD) or Digital Video Disc (DVD) drive, floppy disk drive, or other device capable of inputting data to, and outputting data from, user computing system 100, whether available or known at the time of filing or as later developed.

As seen in FIG. 1, in one embodiment, financial institution computing system 120 includes one or more processors, CPU(s) 121, a communication interface 122, and a memory 123.

As seen in FIG. 1, in one embodiment, memory 123 includes all, or part of, process for secure syndicated balance display 200, shown as process 200 in FIG. 1.

In one embodiment, financial institution computing system 120 is a computing system associated with one or more of the designated financial accounts associated with the user of designated accounts/website data 102 to be monitored using process for secure syndicated balance display 200.

In one embodiment, financial institution computing system 120 is associated with any one or more of, but not limited to: debit card accounts; credit card accounts; checking accounts; savings accounts; and or any other account, or account type, as discussed herein, and/or as known in the art/available at the time of filing, and/or as developed/made available after the time of filing.

In one embodiment, memory system 123 includes all, or part of, increment/range data 104 including data, processes and/or procedures for defining one or more balance increments. In one embodiment, the one or more balance increments are selected to define specified balance ranges. As a specific example, in one embodiment the one or more balance increments are selected to define ranges of $0-$500, $501-$750, $751-$1000, and balances over $1000. In various embodiments, the balance ranges defined by the balance increments are to be applied to a single financial account designated by the user as discussed above. In other embodiments, the balance ranges defined by the balance increments are applied to the combined balances of two or more financial accounts designated by the user as discussed above.

In one embodiment, memory system 123 receives all, or part of, increment/range data 104 from user computing system 100 via communications link 140A.

In one embodiment, memory system 123 includes all, or part of, balance display symbols data 106 including data, processes, and/or procedures for associating a unique balance indicator image, symbol, or display, with each defined balance increment/range of increment/range data 104.

In one embodiment, the unique balance indicator images, symbols, or displays, of balance display symbols data 106 are chosen/selected by the user, and or the process for secure syndicated balance display, such that a different/unique balance indicator image, symbol, or display, is associated with, or linked to, each defined balance increment/range so that when an actual financial account(s) balance amount is present/detected that is within a specific balance increment/range, a specific and unique balance indicator image, symbol, or display, is indicated and displayed. As discussed below, in this way the actual financial account(s) balance amount is encoded using the specific and unique balance indicator images, symbols, or displays.

In one embodiment, memory system 123 receives all, or part of, balance display symbols data 106 from user computing system 100 via communications link 140A.

In one embodiment, memory system 123 includes all, or part of, current balance data 108 including data, processes, and/or procedures for obtaining, and processing data indicating the current balance in the designated one or more financial accounts of designated accounts/website data 102. In one embodiment, the data indicating the current balance in the designated one or more financial accounts is obtained from one or more third party sources, such as a financial management system used by, or associated with the user.

In one embodiment, increment/range data 104, balance display symbols data 106, and current balance data 108 are used as input to matching engine 125.

In one embodiment, at matching engine 125 the current balance amount data of current balance data 108 is encoded using the appropriate balance indicator image, symbol, or display, of balance display symbols data 106, which is associated with the defined balance increment of increment/range data 104 that includes the actual current account balance amount of current balance data 108.

In one embodiment appropriate balance display symbol 160 is then generated and sent via communication links 140A and/or 140B to user computing system 100 and/or designated website system 150 for display on a display device 109 associated with user computing system 100 as part of, on, in, or through, the accessed designated website or application of designated accounts/website data 102 and/or designated applications 107.

In various embodiments, appropriate balance display symbol 160 is displayed on an "on demand" basis, and/or only when a designated website or application is accessed. In other embodiments, appropriate balance display symbol 160 is displayed automatically on either a periodic or continuous basis.

In various embodiments, financial institution computing system 120 is any computing system discussed herein, and/or as known in the art at the time of filing, and/or as developed after the time of filing that includes components that can execute all, or part, of a process for secure syndicated balance display, in accordance with at least one of the embodiments as described herein.

Also shown in FIG. 1 is database 170. In one embodiment, database 170 is a data storage device, a designated server system or computing system, or a designated portion of one or more server systems or computing systems, such as computing systems 100, 150 and 120, or a distributed database, or an external and/or portable hard drive. In one embodiment, database 170 is a dedicated mass storage device implemented in software, hardware, or a combination of hardware and software. In one embodiment, database 170 is a web-based function.

As discussed in more detail below, in one embodiment, database 170 is under the control of a process for secure syndicated balance display, such as exemplary process 200, and includes all, or part of, designated accounts/website data 102, increment/range data 104, balance display symbols data 106, current balance data 108, and/or designated applications 107.

In one embodiment, computing systems 100 and 150, and database 170, are linked to financial institution computing system 120 via communications channels 140A, 140B, and 140C, respectively. In various embodiments, any, or all, of communications channels 140A, 140B, and 140C can be, but are not limited to: a mobile communication link, such as a mobile phone link; a land-line phone link; a cable-based communications link; a satellite communications link; the Internet, or other network communications link; and/or any other communications link, or combination of communications links, as discussed herein, and/or as known in the art at the time of filing, and/or as developed after the time of filing.

In various embodiments, any, or all, of communications channels 140A, 140B, and 140C, are any SMS communication link as discussed herein, and/or as known in the art at the time of filing, and/or as developed after the time of filing. Short Message Service (SMS) is the text communication service component of phone, web, or mobile communication systems. SMS uses relatively ridged standardized communications protocols that allow the exchange of only very short text messages between fixed line or mobile phone devices in "SMS format".

In various embodiments any, or all, of communications channels 140A, 140B, and 140C include any network or network system that is of interest to a consumer such as, a peer-to-peer network, a hybrid peer-to-peer network, a Local Area Network (LAN), a Wide Area Network (WAN), a public network, such as the Internet, a private network, a combination of different network types, or other wireless, wired, and/or a wireless and wired combination network capable of allowing communication between two or more computing systems, whether available or known at the time of filing or as later developed.

In one embodiment, computing systems 100 and 150, database 170, financial institution computing system 120, and any, or all, of communications channels 140A, 140B, and 140C, are part of a cloud computing environment.

Those of skill in the art will readily recognize that the components shown in FIG. 1 and their respective sub-components, are shown for illustrative purposes only and that architectures with more or fewer components can implement, and benefit from, the invention. Moreover, one or more components may be located remotely from their respective system and accessed via network, as discussed herein. In addition, the particular type of, and configuration of, computing systems 100, 150, database 170, and financial institution computing system 120 are not relevant.

Although a process for secure syndicated balance display, such as process for secure syndicated balance display 200, is sometimes referred to herein, alternatively, as a process, an application, a module, a program, a component of a software system, a component of a software package, a component of a parent system, a plug-in, or a feature of a parent system, this terminology is illustrative only. In some embodiments, a process for secure syndicated balance display, such as process for secure syndicated balance display 200, is capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPU(s) 101, 151, and/or 121.

In one embodiment, a process for secure syndicated balance display, such as process for secure syndicated balance display 200, is a computer application or process implemented and/or run and/or stored, in full, or in part, in, or on, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, or other media or process capable of delivering computer readable data representing computer readable code, whether available or known at the time of filing or as later developed. This medium may belong to a computing system, such as computing systems 100, 120, and 150 of FIG. 1, described above. However, in some embodiments, the medium also may be removable and/or remote from the computing system.

Process

In accordance with one embodiment, a method and system for secure syndicated balance display includes a process for secure syndicated balance display whereby, in one embodiment, one or more financial accounts associated with a user are designated for balance monitoring and balance display. In one embodiment, balance increments are then defined. A unique balance indicator image, symbol, or display, is then selected and/or associated with each defined balance increment. In one embodiment, one or more websites, and/or applications, are designated to receive data representing the balance indicator images, symbols, or displays, i.e., to display the balance indicator images, symbols, or displays. In one embodiment, when one of the designated websites or applications is accessed by the user via a user computing system, data indicating a current balance in the designated one or more financial accounts is obtained. In one embodiment, the current balance amount is then encoded using the appropriate balance indicator image, symbol, or display, which is associated with the defined balance increment that includes the actual current account balance amount. In one embodiment, the appropriate balance indicator image, symbol, or display, is then displayed on a display device associated with the user computing system as part of, on, in, or through, the accessed designated website or application.

Figure 2:
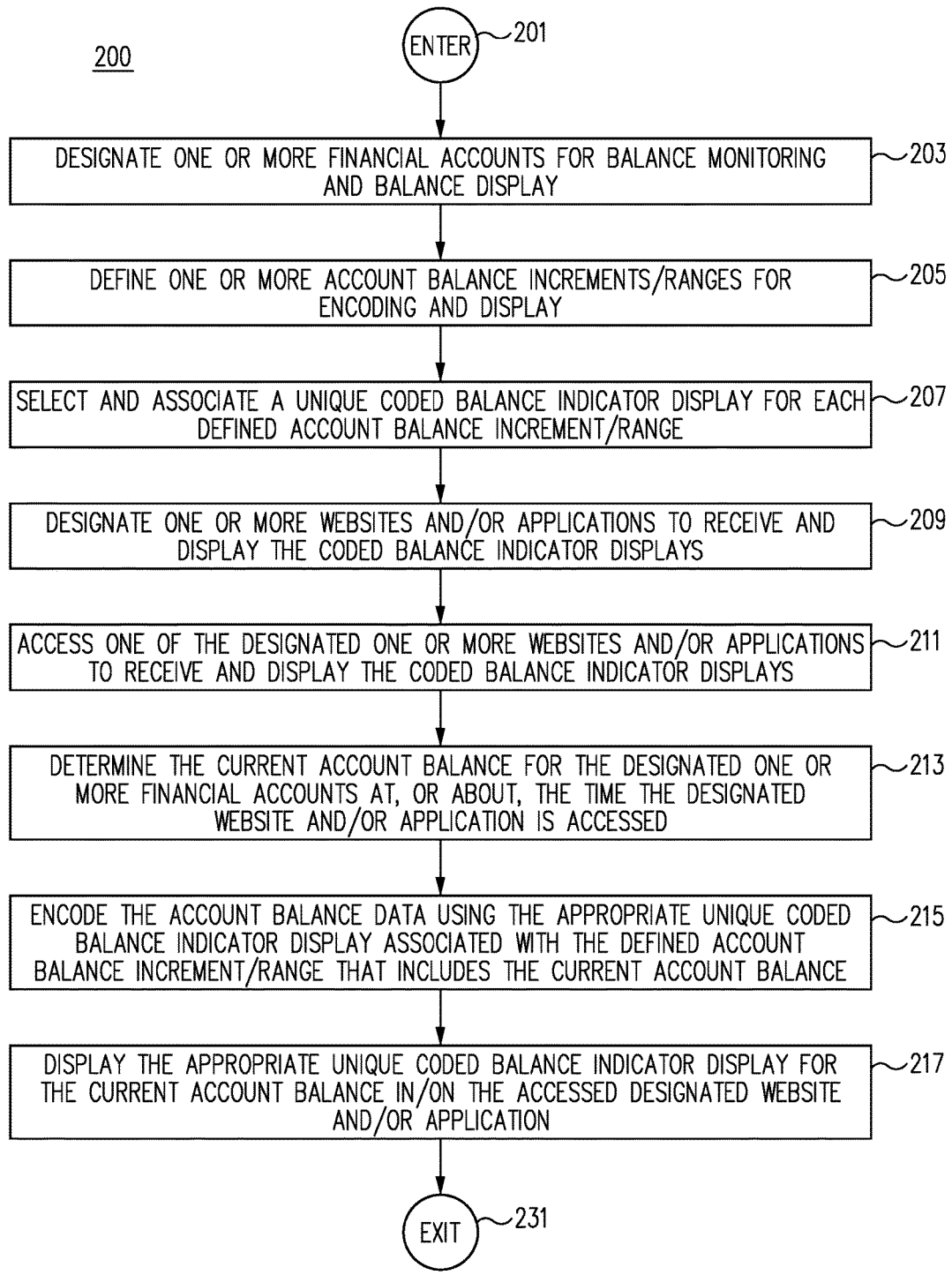
FIG. 2 is a flow chart depicting a process for secure syndicated balance display in accordance with one embodiment.

FIG. 2 a flow chart depicting a process for secure syndicated balance display 200 in accordance with one embodiment. Process for secure syndicated balance display 200 begins at ENTER OPERATION 201 of FIG. 2 and process flow proceeds to DESIGNATE ONE OR MORE FINANCIAL ACCOUNTS FOR BALANCE MONITORING AND BALANCE DISPLAY OPERATION 203.

In one embodiment, at least part of process for secure syndicated balance display 200 is implemented on a user computing system, and/or a user mobile computing system, such as user computing system 100 of FIG. 1.

Herein the term "computing system" includes, but is not limited to, any computing system known in the art at the time of filing, and/or as developed after the time of filing, such as, but not limited to: a mobile computing system; a desktop computing system; a laptop computing system; a notebook computing system; a workstation; a two-way pager; a cellular telephone; a smart phone; a digital wireless telephone; a Personal Digital Assistant (PDA); a server computer; an Internet appliance, and/or any other device, or any desired combination of these devices, that includes components that can execute all, or part, of a process for secure syndicated balance display in accordance with at least one of the embodiments as discussed herein, and/or as known in the art at the time of filing, and/or as developed after the time of filing.

Herein, the term "mobile computing system" includes, but not limited to: a mobile phone; a smart phone; an internet appliance; any SMS capable system; or any other mobile computing system as discussed herein, and/or as known in the art at the time of filing, and/or as developed after the time of filing.

Returning to FIG. 1, in one embodiment, at least part of process for secure syndicated balance display 200 is, or is associated with, one or more applications and/or data management systems implemented on one or more computing systems.

Herein, the term "application" includes, but is not limited to, any computing system implemented, and/or online, systems, packages, programs, and/or modules, implemented in whole, or in part, by any computing system and/or website as discussed herein, and/or as known in the art/available at the time of filing, and/or as developed/made available after the time of filing. Specific examples of applications include, but are not limited to, mobile applications, social media applications, data management systems, operating systems, interface systems, and/or financial management systems.

As discussed in more detail below, in one embodiment, process for secure syndicated balance display 200 is part of, accessed through, or otherwise associated with, one or more electronic payment systems such as PayPal™, or various on-line payment features provided by various financial institutions.

In various embodiments, process for secure syndicated balance display 200 is a "stand alone" system, package, program, module, or application.

In one embodiment, at DESIGNATE ONE OR MORE FINANCIAL ACCOUNTS FOR BALANCE MONITORING AND BALANCE DISPLAY OPERATION 203 one or more financial accounts associated with a user are designated for balance monitoring and balance display using process for secure syndicated balance display 200.

In one embodiment, the one or more financial accounts associated with the user of DESIGNATE ONE OR MORE FINANCIAL ACCOUNTS FOR BALANCE MONITORING AND BALANCE DISPLAY OPERATION 203 can be any one or more of, but not limited to: debit card accounts; credit card accounts; checking accounts; savings accounts; and or any other account, or account type, as discussed herein, and/or as known in the art/available at the time of filing, and/or as developed/made available after the time of filing.

In one embodiment, at DESIGNATE ONE OR MORE FINANCIAL ACCOUNTS FOR BALANCE MONITORING AND BALANCE DISPLAY OPERATION 203 the one or more financial accounts associated with the user are designated by the user via a user interface display displayed on a display device associated with one or more computing systems, and one or more user interface devices, such as a keyboard, mouse, touchscreen, touchpad, voice-recognition system, or any other device or mechanism for providing user input and converting the user input into computing system instructions and/or actions.

In one embodiment, at DESIGNATE ONE OR MORE FINANCIAL ACCOUNTS FOR BALANCE MONITORING AND BALANCE DISPLAY OPERATION 203 the one or more financial accounts associated with the user are designated through process for secure syndicated balance display 200.

In one embodiment, at DESIGNATE ONE OR MORE FINANCIAL ACCOUNTS FOR BALANCE MONITORING AND BALANCE DISPLAY OPERATION 203 the one or more financial accounts associated with user are designated through one or more websites associated with one or more financial institutions.

In one embodiment, at DESIGNATE ONE OR MORE FINANCIAL ACCOUNTS FOR BALANCE MONITORING AND BALANCE DISPLAY OPERATION 203 the financial accounts associated with the user are designated through one or more designated applications, such as, but not limited to, mobile computing system applications.

In one embodiment, once one or more financial accounts associated with a user are designated for balance monitoring and balance display using process for secure syndicated balance display 200 at DESIGNATE ONE OR MORE FINANCIAL ACCOUNTS FOR BALANCE MONITORING AND BALANCE DISPLAY OPERATION 203, process flow proceeds to DEFINE ONE OR MORE ACCOUNT BALANCE INCREMENTS/RANGES FOR ENCODING AND DISPLAY OPERATION 205.

In one embodiment, at DEFINE ONE OR MORE ACCOUNT BALANCE INCREMENTS/RANGES FOR ENCODING AND DISPLAY OPERATION 205 one or more balance increments are defined.

In one embodiment, the one or more balance increments of DEFINE ONE OR MORE ACCOUNT BALANCE INCREMENTS/RANGES FOR ENCODING AND DISPLAY OPERATION 205 are selected to define specified balance ranges.

In various embodiments, the one or more balance increments of DEFINE ONE OR MORE ACCOUNT BALANCE INCREMENTS/RANGES FOR ENCODING AND DISPLAY OPERATION 205 are selected to define any desired balance ranges. As a specific example, for illustrative purposes only, in one embodiment the one or more balance increments are selected to define ranges of $0-$500, $501-$750, $751-$1000, and balances over $1000.

In various embodiments, the balance ranges defined by the balance increments of DEFINE ONE OR MORE ACCOUNT BALANCE INCREMENTS/RANGES FOR ENCODING AND DISPLAY OPERATION 205 are to be applied to a single financial account designated by the user as discussed above.

In other embodiments, the balance ranges defined by the balance increments of DEFINE ONE OR MORE ACCOUNT BALANCE INCREMENTS/RANGES FOR ENCODING AND DISPLAY OPERATION 205 are applied to the combined balances of two or more financial accounts designated by the user as discussed above.

In one embodiment, the one or more balance increments of DEFINE ONE OR MORE ACCOUNT BALANCE INCREMENTS/RANGES FOR ENCODING AND DISPLAY OPERATION 205 are automatically assigned/defined by process for secure syndicated balance display 200.

In one embodiment, the one or more balance increments of DEFINE ONE OR MORE ACCOUNT BALANCE INCREMENTS/RANGES FOR ENCODING AND DISPLAY OPERATION 205 are defined by the user via a user interface display displayed on a display device associated with one or more computing systems, and one or more user interface devices, such as a keyboard, mouse, touchscreen, touchpad, voice-recognition system, or any other device or mechanism for providing user input and converting the user input into computing system instructions and/or actions.

In one embodiment, the one or more balance increments of DEFINE ONE OR MORE ACCOUNT BALANCE INCREMENTS/RANGES FOR ENCODING AND DISPLAY OPERATION 205 are defined through process for secure syndicated balance display 200.

In one embodiment, the one or more balance increments of DEFINE ONE OR MORE ACCOUNT BALANCE INCREMENTS/RANGES FOR ENCODING AND DISPLAY OPERATION 205 are defined through one or more websites associated with one or more financial institutions.

In one embodiment the one or more balance increments of DEFINE ONE OR MORE ACCOUNT BALANCE INCREMENTS/RANGES FOR ENCODING AND DISPLAY OPERATION 205 are defined through one or more designated applications, such as, but not limited to, mobile computing system applications.

In one embodiment, once one or more balance increments are defined at DEFINE ONE OR MORE ACCOUNT BALANCE INCREMENTS/RANGES FOR ENCODING AND DISPLAY OPERATION 205, process flow proceeds to SELECT AND ASSOCIATE A UNIQUE CODED BALANCE INDICATOR DISPLAY FOR EACH DEFINED ACCOUNT BALANCE INCREMENT/RANGE OPERATION 207.

In one embodiment, at SELECT AND ASSOCIATE A UNIQUE CODED BALANCE INDICATOR DISPLAY FOR EACH DEFINED ACCOUNT BALANCE INCREMENT/RANGE OPERATION 207 a unique balance indicator image, symbol, or display, is associated with each defined balance increment/range of DEFINE ONE OR MORE ACCOUNT BALANCE INCREMENTS/RANGES FOR ENCODING AND DISPLAY OPERATION 205.

In one embodiment, the unique balance indicator images, symbols, or displays, of SELECT AND ASSOCIATE A UNIQUE CODED BALANCE INDICATOR DISPLAY FOR EACH DEFINED ACCOUNT BALANCE INCREMENT/RANGE OPERATION 207 are chosen/selected by the user, and or process for secure syndicated balance display 200, such that a different/unique balance indicator image, symbol, or display, is associated with, or linked to, each defined balance increment/range so that when an actual financial account(s) balance amount is present/detected that is within a specific balance increment/range, a specific and unique balance indicator image, symbol, or display, is indicated and displayed. As discussed below, in this way the actual financial account(s) balance amount is encoded using the specific and unique balance indicator images, symbols, or displays.

In various embodiments, the balance indicator images, symbols, or displays, of SELECT AND ASSOCIATE A UNIQUE CODED BALANCE INDICATOR DISPLAY FOR EACH DEFINED ACCOUNT BALANCE INCREMENT/RANGE OPERATION 207 include, but are not limited to, any singular, combination, or multi-symbol graphical display such as, but not limited to: graphical caricatures, letters, stars, codes, thermometers, sliding scales, any animated graphical representation, or any partially filed display, or symbol, or outline thereof, and/or any specified color, shape and/or size of these symbols or graphical displays.

For instance, as one example, at SELECT AND ASSOCIATE A UNIQUE CODED BALANCE INDICATOR DISPLAY FOR EACH DEFINED ACCOUNT BALANCE INCREMENT/RANGE OPERATION 207 balance indicator images, symbols, or displays, having a different number of the same elements are assigned to each defined balance increment/range, such as one or more stars or dollar signs.

As another specific example, at SELECT AND ASSOCIATE A UNIQUE CODED BALANCE INDICATOR DISPLAY FOR EACH DEFINED ACCOUNT BALANCE INCREMENT/RANGE OPERATION 207 a balance indicator image, symbol, or display, of a different type is assigned to each defined balance increment/range such as a different type of animal, or object, or other graphic image.

As another specific example, at SELECT AND ASSOCIATE A UNIQUE CODED BALANCE INDICATOR DISPLAY FOR EACH DEFINED ACCOUNT BALANCE INCREMENT/RANGE OPERATION 207 a balance indicator image, symbol, or display, of a different size is assigned to each defined balance increment/range, such as a different size animal, symbol, wallet graphic, bank graphic, or any other graphic image.

As another example, at SELECT AND ASSOCIATE A UNIQUE CODED BALANCE INDICATOR DISPLAY FOR EACH DEFINED ACCOUNT BALANCE INCREMENT/RANGE OPERATION 207 a balance indicator image, symbol, or display, of a different color is assigned to each defined balance increment/range, such as a different color animal, symbol, wallet, dollar symbol, bank symbol or any other graphic image.

In various embodiments the balance indicator images, symbols, or displays, of SELECT AND ASSOCIATE A UNIQUE CODED BALANCE INDICATOR DISPLAY FOR EACH DEFINED ACCOUNT BALANCE INCREMENT/RANGE OPERATION 207 can include, but are not limited to, background displays of various types and/or colors that are displayed on a user interface screen of a display device associated with a user computing system.

For instance, as one specific example, in one embodiment, at SELECT AND ASSOCIATE A UNIQUE CODED BALANCE INDICATOR DISPLAY FOR EACH DEFINED ACCOUNT BALANCE INCREMENT/RANGE OPERATION 207 a different color background display, or a different background scene, is assigned to each balance increment.

In various embodiments, the balance indicator images, symbols, or displays, of SELECT AND ASSOCIATE A UNIQUE CODED BALANCE INDICATOR DISPLAY FOR EACH DEFINED ACCOUNT BALANCE INCREMENT/RANGE OPERATION 207 include, but are not limited to, an animated balance indicator image, symbol, or display. In various embodiments, at SELECT AND ASSOCIATE A UNIQUE CODED BALANCE INDICATOR DISPLAY FOR EACH DEFINED ACCOUNT BALANCE INCREMENT/RANGE OPERATION 207 an animated balance indicator image, symbol, or display, performing a different motion, or doing a different task, or as otherwise differentially animated, is assigned to each defined balance increment/range.

In various embodiments, the balance indicator images, symbols, or displays, of SELECT AND ASSOCIATE A UNIQUE CODED BALANCE INDICATOR DISPLAY FOR EACH DEFINED ACCOUNT BALANCE INCREMENT/RANGE OPERATION 207 include, but are not limited to, caricatures or avatar displays, or symbols.

In various embodiments, at SELECT AND ASSOCIATE A UNIQUE CODED BALANCE INDICATOR DISPLAY FOR EACH DEFINED ACCOUNT BALANCE INCREMENT/RANGE OPERATION 207 a caricature or avatar of different appearance, or animated motion, is assigned to each defined balance increment/range. For instance, as one specific illustrative example, a caricature or avatar having a different body type, such as fatter or thinner, or performing a different motion, is assigned to each defined balance increment/range.

In various embodiments, virtually any discrete displays, graphics, symbol, or symbols, or any background display or color scheme may be selected at SELECT AND ASSOCIATE A UNIQUE CODED BALANCE INDICATOR DISPLAY FOR EACH DEFINED ACCOUNT BALANCE INCREMENT/RANGE OPERATION 207 as balance indicator images, symbols, or displays.

In various embodiments, virtually any discrete displays, graphics, symbol, or symbols, or any background display or color scheme may be used as balance indicator images, symbols, or displays.

As an specific example made for illustrative purposes, a user can user set balance increments such as "over $1500", "over $500", "over $250", and "under $250", and associate these balance increments with "blue", "green", "yellow", "red" balance indicator images, symbols, or displays respectively.

As an specific example made for illustrative purposes, a user can user set balance increments such as "over $100", "over $500", "over $1000", and "under $100", and associate these balance increments with a "tiger", "lion", "panther", "bobcat" balance indicator images, symbols, or displays, respectively.

In various embodiments, the balance indicator images, symbols, or displays can be as abstract and/or cryptic as the user desires. However, the more logical the link between the balance increments and the balance indicator images, symbols, or displays, the easier they will be to decipher.

In one embodiment, the unique balance indicator images, symbols, or displays, are provided and assigned to the balance increments by the user at SELECT AND ASSOCIATE A UNIQUE CODED BALANCE INDICATOR DISPLAY FOR EACH DEFINED ACCOUNT BALANCE INCREMENT/RANGE OPERATION 207.

In one embodiment, a listing of unique balance indicator images, symbols, or displays, are provided to the user by process for secure syndicated balance display 200 and at SELECT AND ASSOCIATE A UNIQUE CODED BALANCE INDICATOR DISPLAY FOR EACH DEFINED ACCOUNT BALANCE INCREMENT/RANGE OPERATION 207 the user selects and assigns the desired unique balance indicator images, symbols, or displays to the balance increments.

In one embodiment, at SELECT AND ASSOCIATE A UNIQUE CODED BALANCE INDICATOR DISPLAY FOR EACH DEFINED ACCOUNT BALANCE INCREMENT/RANGE OPERATION 207 the unique balance indicator images, symbols, or displays, are provided and assigned to the balance increments by the user through process for secure syndicated balance display 200 via a user interface display displayed on a display device associated with one or more computing systems, and one or more user interface devices, such as a keyboard, mouse, touchscreen, touchpad, voice-recognition system, or any other device or mechanism for providing user input and converting the user input into computing system instructions and/or actions.

In one embodiment, at SELECT AND ASSOCIATE A UNIQUE CODED BALANCE INDICATOR DISPLAY FOR EACH DEFINED ACCOUNT BALANCE INCREMENT/RANGE OPERATION 207 the unique balance indicator images, symbols, or displays, are provided and assigned to the balance increments by the user through one or more websites associated with one or more financial institutions.

In one embodiment the unique balance indicator images, symbols, or displays are designated through one or more designated applications, such as, but not limited to, mobile computing system applications.

In one embodiment, once a unique balance indicator image, symbol, or display, is associated with each defined balance increment/range of DEFINE ONE OR MORE ACCOUNT BALANCE INCREMENTS/RANGES FOR ENCODING AND DISPLAY OPERATION 205 at SELECT AND ASSOCIATE A UNIQUE CODED BALANCE INDICATOR DISPLAY FOR EACH DEFINED ACCOUNT BALANCE INCREMENT/RANGE OPERATION 207, process flow proceeds to DESIGNATE ONE OR MORE WEBSITES AND/OR APPLICATIONS TO RECEIVE AND DISPLAY THE CODED BALANCE INDICATOR DISPLAYS OPERATION 209.

In one embodiment, at DESIGNATE ONE OR MORE WEBSITES AND/OR APPLICATIONS TO RECEIVE AND DISPLAY THE CODED BALANCE INDICATOR DISPLAYS OPERATION 209 one or more websites, and/or applications, are designated to receive data representing the balance indicator images, symbols, or displays, i.e., to display the balance indicator images, symbols, or displays.

In one embodiment, the one or more websites, and/or applications, designated to receive data representing the balance indicator images, symbols, or displays, of DESIGNATE ONE OR MORE WEBSITES AND/OR APPLICATIONS TO RECEIVE AND DISPLAY THE CODED BALANCE INDICATOR DISPLAYS OPERATION 209 can be any one or more of, but not limited to: websites, and/or applications, associated with one or more providers of products and services; websites, and/or applications, associated with online auctions; websites, and/or applications, through which any products and/or service can be purchased; mobile applications; any applications associated with screen displays, background displays, and/or other displays generated and/or shown on a computing system; and/or any other websites, and/or applications, of interest to the user and designated by the user and/or process for secure syndicated balance display 200.

In one embodiment, once one or more websites, and/or applications, are designated to receive data representing the balance indicator images, symbols, or displays at DESIGNATE ONE OR MORE WEBSITES AND/OR APPLICATIONS TO RECEIVE AND DISPLAY THE CODED BALANCE INDICATOR DISPLAYS OPERATION 209, a Personal Identification Number (PIN) is assigned to the user which is unique to the user.

In one embodiment, data indicating the designated financial accounts of DESIGNATE ONE OR MORE FINANCIAL ACCOUNTS FOR BALANCE MONITORING AND BALANCE DISPLAY OPERATION 203, data indicating the balance increments/ranges of DEFINE ONE OR MORE ACCOUNT BALANCE INCREMENTS/RANGES FOR ENCODING AND DISPLAY OPERATION 205 and the balance indicator images, symbols, or displays, associated/assigned to the balance increments/ranges of SELECT AND ASSOCIATE A UNIQUE CODED BALANCE INDICATOR DISPLAY FOR EACH DEFINED ACCOUNT BALANCE INCREMENT/RANGE OPERATION 207, and data indicating the one or more websites, and/or applications, designated to receive data representing the balance indicator images, symbols, or displays of DESIGNATE ONE OR MORE WEBSITES AND/OR APPLICATIONS TO RECEIVE AND DISPLAY THE CODED BALANCE INDICATOR DISPLAYS OPERATION 209, is linked and stored.

In one embodiment, data indicating the designated financial accounts of DESIGNATE ONE OR MORE FINANCIAL ACCOUNTS FOR BALANCE MONITORING AND BALANCE DISPLAY OPERATION 203, data indicating the balance increments/ranges of DEFINE ONE OR MORE ACCOUNT BALANCE INCREMENTS/RANGES FOR ENCODING AND DISPLAY OPERATION 205 and the balance indicator images, symbols, or displays, associated/assigned to the balance increments/ranges of SELECT AND ASSOCIATE A UNIQUE CODED BALANCE INDICATOR DISPLAY FOR EACH DEFINED ACCOUNT BALANCE INCREMENT/RANGE OPERATION 207, and data indicating the one or more websites, and/or applications, designated to receive data representing the balance indicator images, symbols, or displays of DESIGNATE ONE OR MORE WEBSITES AND/OR APPLICATIONS TO RECEIVE AND DISPLAY THE CODED BALANCE INDICATOR DISPLAYS OPERATION 209, is linked and stored under the direction of one or more processors, such as CPU(s) 101 and/or 121 and/or 151 of FIG. 1, associated with one or more computing systems, such user computing system 100, designated website system 150, and/or financial institution computing system 120 of FIG. 1.

In one embodiment, data is saved/stored in a file assigned to the user in one or more memory systems, such as memories 103, 153, and/or 123 of FIG. 1, and/or computing systems, such as computing systems 100, 120 and/or 150 of FIG. 1, by, or through, process for secure syndicated balance display 200.

In various embodiments, the data is saved/stored in whole, or in part, in a database, such as database 170 of FIG. 1, maintained by, accessible by, owned by, or otherwise related to: process for secure syndicated balance display 200 (FIG. 1), and/or a provider of process for secure syndicated balance display 200; a data management system, and/or a provider of a data management system; a financial institution, or financial institution website/database; a social media system/network, and/or a provider of a social media system/network; or any other party, by any one of the numerous mechanisms known to those of skill in the art.

Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as defined herein, known at the time of filing, or as developed thereafter.

For instance, in one embodiment, the data is saved/stored in whole, or in part, in a memory system, or in a cache memory, or in any main memory or mass memory, associated with any computing system as discussed herein, and/or as known/available in the art at the time of filing, and/or as developed/made available after the time of filing. In one embodiment, the data, in whole, or in part, is stored in any computing system and/or server system, or other device, in another location, or on/in a computer readable medium, and/or any other computer program product, as defined herein. In one embodiment, the data, in whole, or in part, is stored on a webpage, in a web-based system, or on a public network such as the Internet.

In some embodiments, the data, stored as described above, is maintained, in whole, or in part, by: process for secure syndicated balance display 200, and/or a provider of process for secure syndicated balance display 200; a data management system, and/or a provider of a data management system; a financial institution, and/or a financial institution website; a social media system/network, and/or a provider of a social media system/network; a third party data storage institution; any third party service or institution; and/or any other parties. In some of these embodiments, access to the data is then provided to process for secure syndicated balance display 200 by providing access to the data and/or providing the data on a computer program product.

In one embodiment, once one or more websites, and/or applications, are designated to receive data representing the balance indicator images, symbols, or displays, i.e., to display the balance indicator images, symbols, or displays at DESIGNATE ONE OR MORE WEBSITES AND/OR APPLICATIONS TO RECEIVE AND DISPLAY THE CODED BALANCE INDICATOR DISPLAYS OPERATION 209 process flow proceeds to ACCESS ONE OF THE DESIGNATED ONE OR MORE WEBSITES AND/OR APPLICATIONS TO RECEIVE AND DISPLAY THE CODED BALANCE INDICATOR DISPLAYS OPERATION 211.

In one embodiment, at ACCESS ONE OF THE DESIGNATED ONE OR MORE WEBSITES AND/OR APPLICATIONS TO RECEIVE AND DISPLAY THE CODED BALANCE INDICATOR DISPLAYS OPERATION 211 one of the designated websites or applications of DESIGNATE ONE OR MORE WEBSITES AND/OR APPLICATIONS TO RECEIVE AND DISPLAY THE CODED BALANCE INDICATOR DISPLAYS OPERATION 209 is accessed by the user.

In one embodiment, at ACCESS ONE OF THE DESIGNATED ONE OR MORE WEBSITES AND/OR APPLICATIONS TO RECEIVE AND DISPLAY THE CODED BALANCE INDICATOR DISPLAYS OPERATION 211 one of the designated websites or applications of DESIGNATE ONE OR MORE WEBSITES AND/OR APPLICATIONS TO RECEIVE AND DISPLAY THE CODED BALANCE INDICATOR DISPLAYS OPERATION 209 is accessed by the user via a user computing system, or user mobile computing system, such as user computing system 100 of FIG. 1.

Returning to FIG. 2, once one of the designated websites or applications of DESIGNATE ONE OR MORE WEBSITES AND/OR APPLICATIONS TO RECEIVE AND DISPLAY THE CODED BALANCE INDICATOR DISPLAYS OPERATION 209 is accessed by the user at ACCESS ONE OF THE DESIGNATED ONE OR MORE WEBSITES AND/OR APPLICATIONS TO RECEIVE AND DISPLAY THE CODED BALANCE INDICATOR DISPLAYS OPERATION 211, process flow proceeds to DETERMINE THE CURRENT ACCOUNT BALANCE FOR THE DESIGNATED ONE OR MORE FINANCIAL ACCOUNTS AT, OR ABOUT, THE TIME THE DESIGNATED WEBSITE AND/OR APPLICATION IS ACCESSED OPERATION 213.

In one embodiment, at DETERMINE THE CURRENT ACCOUNT BALANCE FOR THE DESIGNATED ONE OR MORE FINANCIAL ACCOUNTS AT, OR ABOUT, THE TIME THE DESIGNATED WEBSITE AND/OR APPLICATION IS ACCESSED OPERATION 213 data indicating the current balance in the designated one or more financial accounts of DESIGNATE ONE OR MORE FINANCIAL ACCOUNTS FOR BALANCE MONITORING AND BALANCE DISPLAY OPERATION 203 is obtained.

In one embodiment, at DETERMINE THE CURRENT ACCOUNT BALANCE FOR THE DESIGNATED ONE OR MORE FINANCIAL ACCOUNTS AT, OR ABOUT, THE TIME THE DESIGNATED WEBSITE AND/OR APPLICATION IS ACCESSED OPERATION 213 data indicating the current balance in the designated one or more financial accounts of DESIGNATE ONE OR MORE FINANCIAL ACCOUNTS FOR BALANCE MONITORING AND BALANCE DISPLAY OPERATION 203 is obtained from one or more websites, and/or databases, associated with one or more financial institutions providing the one or the more financial accounts of DESIGNATE ONE OR MORE FINANCIAL ACCOUNTS FOR BALANCE MONITORING AND BALANCE DISPLAY OPERATION 203.

In one embodiment, at DETERMINE THE CURRENT ACCOUNT BALANCE FOR THE DESIGNATED ONE OR MORE FINANCIAL ACCOUNTS AT, OR ABOUT, THE TIME THE DESIGNATED WEBSITE AND/OR APPLICATION IS ACCESSED OPERATION 213 the data indicating the current balance in the designated one or more financial accounts is obtained from one or more third party sources, such as a financial management system used by, or associated with, the user.

Herein, the term data management system includes, but is not limited to: any of the following: computing system implemented, and/or online, personal and/or business receipt management systems, packages, programs, modules, or applications; computing system implemented, and/or online, personal and/or business financial management systems, packages, programs, modules, or applications; computing system implemented, and/or online, personal and/or business tax preparation systems, packages, programs, modules, or applications; computing system implemented, and/or online, personal and/or business accounting and/or invoicing systems, packages, programs, modules, or applications; computing system implemented, and/or online, bookkeeping systems, packages, programs, modules, or applications; and various other personal and/or business electronic data management systems, packages, programs, modules, or applications, whether known at the time of filling or as developed later.

Specific examples of currently available data management systems include, but are not limited to: Mint™, available from Intuit, Inc. of Mountain View, Calif.; Quicken™, available from Intuit, Inc. of Mountain View, Calif.; Quicken On-line™, available from Intuit, Inc. of Mountain View, Calif.; QuickReceipts™, available from Intuit, Inc. of Mountain View, Calif.; QuickBooks™, available from Intuit, Inc. of Mountain View, Calif.; QuickBooks On-line™, available from Intuit, Inc. of Mountain View, Calif.; Quicken Health Expense Manager™, available from Intuit, Inc. of Mountain View, Calif.; Microsoft Money™, previously available from Microsoft, Inc. of Redmond, Wash.; and/or various other data management applications discussed herein, and/or known to those of skill in the art at the time of filing, and/or as developed after the time of filing.

In one embodiment, the data indicating the balance in the designated one or more financial accounts of DETERMINE THE CURRENT ACCOUNT BALANCE FOR THE DESIGNATED ONE OR MORE FINANCIAL ACCOUNTS AT, OR ABOUT, THE TIME THE DESIGNATED WEBSITE AND/OR APPLICATION IS ACCESSED OPERATION 213 is the most current available balance data, i.e., data indicating the balance in the designated one or more financial accounts that has most recently been received, but is not necessarily real-time data.

In one embodiment, at DETERMINE THE CURRENT ACCOUNT BALANCE FOR THE DESIGNATED ONE OR MORE FINANCIAL ACCOUNTS AT, OR ABOUT, THE TIME THE DESIGNATED WEBSITE AND/OR APPLICATION IS ACCESSED OPERATION 213 the data indicating the balance in multiple designated financial accounts is obtained, and combined, to provide a combined most current available balance data for the designated financial accounts.

In one embodiment, once data indicating the current balance in the designated one or more financial accounts of DESIGNATE ONE OR MORE FINANCIAL ACCOUNTS FOR BALANCE MONITORING AND BALANCE DISPLAY OPERATION 203 is obtained from one or more websites, and/or databases, associated with the one or more financial accounts at DETERMINE THE CURRENT ACCOUNT BALANCE FOR THE DESIGNATED ONE OR MORE FINANCIAL ACCOUNTS AT, OR ABOUT, THE TIME THE DESIGNATED WEBSITE AND/OR APPLICATION IS ACCESSED OPERATION 213, process flow proceeds to ENCODE THE ACCOUNT BALANCE DATA USING THE APPROPRIATE UNIQUE CODED BALANCE INDICATOR DISPLAY ASSOCIATED WITH THE DEFINED ACCOUNT BALANCE INCREMENT/RANGE THAT INCLUDES THE CURRENT ACCOUNT BALANCE OPERATION 215.

In one embodiment, at ENCODE THE ACCOUNT BALANCE DATA USING THE APPROPRIATE UNIQUE CODED BALANCE INDICATOR DISPLAY ASSOCIATED WITH THE DEFINED ACCOUNT BALANCE INCREMENT/RANGE THAT INCLUDES THE CURRENT ACCOUNT BALANCE OPERATION 215 the current balance amount data of DETERMINE THE CURRENT ACCOUNT BALANCE FOR THE DESIGNATED ONE OR MORE FINANCIAL ACCOUNTS AT, OR ABOUT, THE TIME THE DESIGNATED WEBSITE AND/OR APPLICATION IS ACCESSED OPERATION 213 is encoded using the appropriate balance indicator image, symbol, or display, of SELECT AND ASSOCIATE A UNIQUE CODED BALANCE INDICATOR DISPLAY FOR EACH DEFINED ACCOUNT BALANCE INCREMENT/RANGE OPERATION 207 which is associated with the defined balance increment of DEFINE ONE OR MORE ACCOUNT BALANCE INCREMENTS/RANGES FOR ENCODING AND DISPLAY OPERATION 205 that includes the actual current account balance amount of DETERMINE THE CURRENT ACCOUNT BALANCE FOR THE DESIGNATED ONE OR MORE FINANCIAL ACCOUNTS AT, OR ABOUT, THE TIME THE DESIGNATED WEBSITE AND/OR APPLICATION IS ACCESSED OPERATION 213.

In one embodiment, once the current balance amount data of DETERMINE THE CURRENT ACCOUNT BALANCE FOR THE DESIGNATED ONE OR MORE FINANCIAL ACCOUNTS AT, OR ABOUT, THE TIME THE DESIGNATED WEBSITE AND/OR APPLICATION IS ACCESSED OPERATION 213 is encoded using the appropriate balance indicator image, symbol, or display, of SELECT AND ASSOCIATE A UNIQUE CODED BALANCE INDICATOR DISPLAY FOR EACH DEFINED ACCOUNT BALANCE INCREMENT/RANGE OPERATION 207 which is associated with the defined balance increment of DEFINE ONE OR MORE ACCOUNT BALANCE INCREMENTS/RANGES FOR ENCODING AND DISPLAY OPERATION 205 that includes the actual current account balance amount of DETERMINE THE CURRENT ACCOUNT BALANCE FOR THE DESIGNATED ONE OR MORE FINANCIAL ACCOUNTS AT, OR ABOUT, THE TIME THE DESIGNATED WEBSITE AND/OR APPLICATION IS ACCESSED OPERATION 213 at ENCODE THE ACCOUNT BALANCE DATA USING THE APPROPRIATE UNIQUE CODED BALANCE INDICATOR DISPLAY ASSOCIATED WITH THE DEFINED ACCOUNT BALANCE INCREMENT/RANGE THAT INCLUDES THE CURRENT ACCOUNT BALANCE OPERATION 215, process flow proceeds to DISPLAY THE APPROPRIATE UNIQUE CODED BALANCE INDICATOR DISPLAY FOR THE CURRENT ACCOUNT BALANCE IN/ON THE ACCESSED DESIGNATED WEBSITE AND/OR APPLICATION OPERATION 217.

In one embodiment, at DISPLAY THE APPROPRIATE UNIQUE CODED BALANCE INDICATOR DISPLAY FOR THE CURRENT ACCOUNT BALANCE IN/ON THE ACCESSED DESIGNATED WEBSITE AND/OR APPLICATION OPERATION 217 the appropriate balance indicator image, symbol, or display, of ENCODE THE ACCOUNT BALANCE DATA USING THE APPROPRIATE UNIQUE CODED BALANCE INDICATOR DISPLAY ASSOCIATED WITH THE DEFINED ACCOUNT BALANCE INCREMENT/RANGE THAT INCLUDES THE CURRENT ACCOUNT BALANCE OPERATION 215 is displayed on a display device associated with the user computing system as part of, on, in, or through, the accessed designated website or application of ACCESS ONE OF THE DESIGNATED ONE OR MORE WEBSITES AND/OR APPLICATIONS TO RECEIVE AND DISPLAY THE CODED BALANCE INDICATOR DISPLAYS OPERATION 211.

In various embodiments, at DISPLAY THE APPROPRIATE UNIQUE CODED BALANCE INDICATOR DISPLAY FOR THE CURRENT ACCOUNT BALANCE IN/ON THE ACCESSED DESIGNATED WEBSITE AND/OR APPLICATION OPERATION 217 the appropriate balance indicator image, symbol, or display, is displayed on an "on demand" basis, and/or only when a designated website or application is accessed. In other embodiments, the appropriate balance indicator image, symbol, or display, is displayed automatically on either a periodic or continuous basis.

In one embodiment, when one of the designated websites or applications is accessed by the user, the user is requested to provide the user's PIN. In one embodiment, the accessed designated website or application then sends a request to a central server, or other computing system, such as user computing system 100 and/or financial institution computing system 120 of FIG. 1, and retrieves the appropriate balance indicator image, symbol, or display, that is associated with the defined balance increment that includes the actual current account balance amount. Consequently, in one embodiment, the accessed designated website or application provider never receives data indicating the actual current account balance amount nor the financial account associated with the balance indicator image, symbol, or display provided. However, the appropriate balance indicator image, symbol, or display is provided for display on a designated screen, such as, but not limited to, a checkout screen, cart screen, or other user interface display.

Returning to FIG. 2, in one embodiment, when one of the designated applications is an application implemented, at least in part, on a computing system, and the application is accessed by the user, the balance indicator image, symbol, or display, that is associated with the defined balance increment that includes the actual current account balance amount is displayed at DISPLAY THE APPROPRIATE UNIQUE CODED BALANCE INDICATOR DISPLAY FOR THE CURRENT ACCOUNT BALANCE IN/ON THE ACCESSED DESIGNATED WEBSITE AND/OR APPLICATION OPERATION 217 in a updated background display on the computing system.

In one embodiment, when one of the designated applications is a mobile application implemented, at least in part, on a mobile computing system, when the mobile application is accessed by the user, the balance indicator image, symbol, or display, that is associated with the defined balance increment that includes the actual current account balance amount is displayed at DISPLAY THE APPROPRIATE UNIQUE CODED BALANCE INDICATOR DISPLAY FOR THE CURRENT ACCOUNT BALANCE IN/ON THE ACCESSED DESIGNATED WEBSITE AND/OR APPLICATION OPERATION 217 in a updated background display background displayed on the mobile computing system.

In one embodiment, once the appropriate balance indicator image, symbol, or display, of ENCODE THE ACCOUNT BALANCE DATA USING THE APPROPRIATE UNIQUE CODED BALANCE INDICATOR DISPLAY ASSOCIATED WITH THE DEFINED ACCOUNT BALANCE INCREMENT/RANGE THAT INCLUDES THE CURRENT ACCOUNT BALANCE OPERATION 215 is displayed on a display device associated with the user computing system as part of, on, in, or through, the accessed designated website or application of ACCESS ONE OF THE DESIGNATED ONE OR MORE WEBSITES AND/OR APPLICATIONS TO RECEIVE AND DISPLAY THE CODED BALANCE INDICATOR DISPLAYS OPERATION 211 at DISPLAY THE APPROPRIATE UNIQUE CODED BALANCE INDICATOR DISPLAY FOR THE CURRENT ACCOUNT BALANCE IN/ON THE ACCESSED DESIGNATED WEBSITE AND/OR APPLICATION OPERATION 217, process flow proceeds to EXIT OPERATION 231

In one embodiment at EXIT OPERATION 231 process for secure syndicated balance display 200 is exited to await new data.

Using process for secure syndicated balance display 200, the user is provided an encoded and visual representation of their current balance in one or more designated accounts at the time the user is contemplating, or making, a purchase, and/or in the actual website interface through which the user is contemplating making, or is making, the purchase. Consequently, using process for secure syndicated balance display 200, a user can elect to make a purchase with the confidence that the user can afford the purchase, and/or has the funds available to pay for the purchase in selected accounts.

In addition, using process for secure syndicated balance display 200, the user's actual balance information is encoded by way of the appropriate balance indicator image, symbol, or display. Consequently, the user's actual balance amounts are neither directly displayed to the user on a display device, a device that potentially can be viewed/accessed by others, nor is the user's actual balance amount data actually provided to the designated websites and/or applications through which the appropriate balance indicator image, symbol, or display, is displayed. Therefore, using process for secure syndicated balance display 200, the user is provided a simple and effective means for determining their account balances without sacrificing their privacy or security. As a result, a significant barrier to some consumer purchases is eliminated and both consumers, who would like to make purchases easily and be confident they can afford and/or pay for the purchases, and merchants, who would like to encourage purchases, are benefited.

In the discussion above, certain aspects of one embodiment include process steps or operations or instructions described herein for illustrative purposes in a particular order or grouping. However, the particular order or grouping shown and discussed herein is illustrative only and not limiting. Those of skill in the art will recognize that other orders or grouping of the process steps or operations or instructions are possible and, in some embodiments, one or more of the process steps or operations or instructions discussed above can be combined or deleted. In addition, portions of one or more of the process steps or operations or instructions can be re-grouped as portions of one or more other of the process steps or operations or instructions discussed herein. Consequently, the particular order or grouping of the process steps or operations or instructions discussed herein does not limit the scope of the invention as claimed below.

As discussed in more detail above, using the above embodiments, with little or no modification and/or consumer input, there is considerable flexibility, adaptability, and opportunity for customization to meet the specific needs of various consumers under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols.

Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "activating", "accessing", "applying", "analyzing", "calculating", "capturing", "categorizing", "classifying", "comparing", "defining", "detecting", "determining", "distributing", "encrypting", "extracting", "filtering", "forwarding", "generating", "identifying", "implementing", "monitoring", "obtaining", "processing", "providing", "receiving", "requesting", "saving", "sending", "storing", "transferring", "transforming", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations.

In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet, or a cloud.

Therefore, numerous variations, whether explicitly provided for by the specification or implied by the specification or not, may be implemented by one of skill in the art in view of this disclosure.

What is claimed is:

1. A system for secure syndicated balance display comprising: one or more computing processors; and one or more memories coupled to the computing processors, the one or more memories having stored therein instructions which when executed by the one or more processors perform a process comprising: designating, at a financial institution website of a financial institution managing one or more financial accounts by an account owner of the one or more financial accounts, at least one of the one or more financial accounts of the account owner for balance monitoring; defining, at the financial institution website of the financial institution managing the one or more financial accounts by the account owner, one or more account balance ranges for encoding; selecting, at the financial institution website of the financial institution managing the one or more financial accounts by the account owner, one or more unique balance indicator images, symbols, or displays to associate with the one or more account balance ranges; associating, on behalf of the financial institution managing the one or more financial accounts, a unique balance indicator image, or symbol, or display with each of the defined one or more account balance ranges; designating, at the financial institution website of the financial institution managing the one or more financial accounts by the account owner, one or more merchant websites to receive data from the financial institution representing the balance indicator images, symbols, or displays, the merchant website being controlled by a merchant and distinct from the financial institution; accessing, by the account owner using an account owner computing system of the account owner during a purchasing process at a merchant website checkout screen, one of the one or more designated merchant websites; responsive to the account owner accessing one of the one or more designated merchant websites, requesting, of a computing system of the financial institution by the accessed one or more designated merchant websites, a balance indicator image, symbol or display; obtaining, by financial institution, current account balance amount data for at least one of the one or more designated financial accounts; determining, by the financial institution, an appropriate balance indicator image, symbol, or display associated with the defined one or more account balance ranges that includes the current account balance amount; transforming, on behalf of the financial institution, the current account balance amount data into the appropriate balance indicator image, symbol, or display data; providing, by the financial institution, the balance indicator image, symbol or display to a designated website system associated with the accessed one or more designated websites; providing, by the designated website system to the account owner computing system, designated website data incorporating the provided balance image, symbol or display; and displaying, on an account owner computing system, the designated website data incorporating the balance image, symbol or display.

2. The system for secure syndicated balance display of claim 1, wherein;
the one or more financial accounts associated with an account owner designated for balance monitoring are selected from the group of financial accounts consisting of:
debit card accounts;
credit card accounts;
checking accounts;
savings accounts;
lines of credit;
home equity accounts; and
retirement accounts.

3. The system for secure syndicated balance display of claim 1, wherein;
at least one of the unique balance indicator images, symbols, or displays is selected from the group of unique balance indicator images, symbols, or displays consisting of:
one or more graphical caricatures of one or more sizes or colors;
one or more letters of one or more sizes or colors;
one or more stars of one or more sizes or colors;
one or more codes of one or more sizes or colors;
one or more thermometers of one or more sizes or colors;
one or more sliding scales of one or more sizes or colors;
one or more animated graphical representations of one or more sizes or colors;
one or more graphical or optical images of an animal of one or more sizes or colors;
one or more graphical or optical images of an object of one or more sizes or colors;
one or more graphical or optical images of a person of one or more sizes or colors;

one or more background displays of one or more sizes or colors; and one or more background images of one or more sizes or colors.

4. The system for secure syndicated balance display of claim 1, wherein;

the account owner accesses the designated website via a mobile computing system.

5. The system for secure syndicated balance display of claim 1, wherein;

the current account balance amount data for at least one of the one or more designated financial accounts is obtained from a website associated with the financial account.

6. A system for secure syndicated balance display comprising:

one or more computing processors; and one or more memories coupled to the computing processors, the one or more memories having stored therein instructions which when executed by the one or more processors perform a process comprising:

designating, at a financial institution website of a financial institution managing one or more financial accounts by an account owner of one or more financial accounts, at least one of the one or more financial accounts of the account owner for balance monitoring;

defining, at the financial institution website of the financial institution managing the one or more financial accounts by the account owner, one or more account balance ranges for encoding;

selecting, at the financial institution website of the financial institution managing the one or more financial accounts by the account owner, unique balance indicator images, symbols, or displays to associate with the one or more account balance ranges;

associating, on behalf of the financial institution managing the one or more financial accounts, a unique balance indicator image, symbol, or display with each of the defined one or more account balance ranges;

designating, by the account owner, one or more merchant applications to receive data from the financial institution representing the balance indicator images, symbols, or displays;

accessing, by the account owner using an account owner computing system of the account owner, during a purchasing process at a merchant application checkout screen, one of the one or more designated applications;

responsive to the account owner accessing one of the one or more designated applications, requesting, of a computing system of the financial institution by the accessed one or more designated applications a balance indicator image, symbol or display;

obtaining, by the financial institution, current account balance amount data for at least one of the one or more designated financial accounts;

determining, by the financial institution, an appropriate balance indicator image, symbol, or display associated with the defined one or more account balance ranges that includes the current account balance amount;

transforming, on behalf of the financial institution, the current account balance amount data into the appropriate balance indicator image, symbol, or display data;

providing, by the financial institution, the balance indicator image, symbol or display to the accessed one or more designated applications; and displaying, on a user computing system of the user, the appropriate balance indicator image, symbol, or display on the accessed one or more designated applications.

7. The system for secure syndicated balance display of claim 6, wherein;

the one or more financial accounts associated with an account owner designated for balance monitoring are selected from the group of financial accounts consisting of:

debit card accounts;
credit card accounts;
checking accounts;
savings accounts;
lines of credit;
home equity accounts; and
retirement accounts.

8. The system for secure syndicated balance display of claim 6, wherein;

at least one of the unique balance indicator images, symbols, or displays is selected from the group of unique balance indicator images, symbols, or displays consisting of:

one or more graphical caricatures of one or more sizes or colors;
one or more letters of one or more sizes or colors;
one or more stars of one or more sizes or colors;
one or more codes of one or more sizes or colors;
one or more thermometers of one or more sizes or colors;
one or more sliding scales of one or more sizes or colors;
one or more animated graphical representations of one or more sizes or colors;
one or more graphical or optical images of an animal of one or more sizes or colors;
one or more graphical or optical images of an object of one or more sizes or colors;
one or more graphical or optical images of a person of one or more sizes or colors;
one or more background displays of one or more sizes or colors; and
one or more background images of one or more sizes or colors.

9. The system for secure syndicated balance display of claim 6, wherein;

the account owner accesses the designated application via a mobile computing system.

10. The system for secure syndicated balance display of claim 6, wherein;

the current account balance amount data for at least one of the one or more designated financial accounts is obtained from a website associated with the financial account.

11. A system for providing a secure syndicated balance display comprising: an account owner computing system accessible by an account owner; a financial institution computing system; one or more merchant websites; one or more processors associated with one or more computing systems, the one or more processors coupled to one or more memories, the one or more memories having stored therein instructions which when executed by the one or more processors, perform a process for secure syndicated balance display, the process for secure syndicated balance display comprising: designating, at a financial institution website of a financial institution managing one or more financial accounts by the account owner, one or more financial accounts of the account owner for balance monitoring; defining, at the financial institution website of the financial institution managing the one or more financial accounts by the account owner, one or more account balance ranges for encoding; selecting, at the financial institution website of the financial institution managing the one or more financial accounts by the account owner, unique balance indicator images, symbols, or displays to associate with the one or more account balance ranges; associating, on behalf of the financial institution managing the one or more financial accounts, a unique balance indicator image, symbol, or display with each of the defined one or more account balance ranges; designating, at the financial institution website of the financial institution managing the one or more financial accounts by the account owner, one or more of the one or more merchant websites to receive data from the financial institution representing the balance indicator images, symbols, or displays, the merchant website being controlled by a merchant and distinct from the financial institution; accessing, by the account owner using an account owner computing system during a purchasing process at a merchant website checkout screen, one of the one or more designated merchant websites via the account owner computing system; responsive to the account owner accessing one of the one or more designated merchant websites, requesting, of a computing system of the financial institution by the accessed one or more designated merchant websites a balance indicator image, symbol or display; obtaining, at the financial computing system, current account balance amount data for at least one of the one or more designated financial accounts from the financial institution computing system; determining, by the financial institution, an appropriate balance indicator image, symbol, or display associated with the defined one or more account balance ranges that includes the current account balance amount; transforming, at or on behalf of the financial institution, the current account balance amount data into the appropriate balance indicator image, symbol, or display data; providing, by the financial institution, the balance indicator image, symbol or display to the accessed one or more designated merchant websites; providing, by the designated website system to the account owner computing system, designated website data incorporating the provided balance image, indicator or symbol; and displaying, on one or more displays of the account owner computing system, the designated website data incorporating the balance indicator image, symbol, or display.

12. The system for providing a secure syndicated balance display of claim 11, wherein;
the one or more financial accounts associated with an account owner designated for balance monitoring are selected from the group of financial accounts consisting of:
debit card accounts;
credit card accounts;
checking accounts;
savings accounts;
lines of credit;
home equity accounts; and
retirement accounts.

13. The system for providing a secure syndicated balance display of claim 11, wherein;
at least one of the unique balance indicator images, symbols, or displays is selected from the group of unique balance indicator images, symbols, or displays consisting of:
one or more graphical caricatures of one or more sizes or colors;
one or more letters of one or more sizes or colors;
one or more stars of one or more sizes or colors;
one or more codes of one or more sizes or colors;
one or more thermometers of one or more sizes or colors;
one or more sliding scales of one or more sizes or colors;
one or more animated graphical representations of one or more sizes or colors;
one or more graphical or optical images of an animal of one or more sizes or colors;
one or more graphical or optical images of an object of one or more sizes or colors;
one or more graphical or optical images of a person of one or more sizes or colors;
one or more background displays of one or more sizes or colors; and
one or more background images of one or more sizes or colors.

14. The system for providing a secure syndicated balance display of claim 11, wherein;
the account owner computing system is a mobile computing system.

15. The system for providing a secure syndicated balance display of claim 11, wherein;
the current account balance amount data for at least one of the one or more designated financial accounts is obtained from a financial management system associated with the account owner.

16. A system for providing a secure syndicated balance display comprising:
an account owner computing system accessible by an account owner;
a financial institution computing system;
one or more merchant applications on a merchant computing system;
one or more processors associated with one or more computing systems, the one or more processors coupled to one or more memories, the one or more memories having stored therein instructions which when executed by the one or more processors, perform a process for secure syndicated balance display, the process for secure syndicated balance display comprising:
designating, at a financial institution website of a financial institution managing one or more financial accounts by the account owner, one or more financial accounts of the account owner for balance monitoring;
defining, at the financial institution website of the financial institution managing the one or more financial accounts by the account owner, defining one or more account balance ranges for encoding;
selecting, at the financial institution website of the financial institution managing the one or more financial accounts by the account owner, unique balance indicator images, symbols, or displays to associate with the one or more account balance ranges;
associating, on behalf of the financial institution managing the one or more financial accounts, a unique balance indicator image, symbol, or display with each of the defined one or more account balance ranges;
designating, at the financial institution website of the financial institution managing the one or more financial accounts by the account owner, one or more of the one or more merchant applications to receive data from the financial institution representing the balance indicator images, symbols, or displays;
accessing, by the account owner using an account owner computing system of the account owner, one of the one or more designated applications via the account owner computing system;

responsive to the account owner accessing one of the one or more designated applications, requesting, of the financial institution computing system by the accessed one or more designated applications, a balance indicator image, symbol or display;

obtaining, by the financial institution, current account balance amount data for at least one of the one or more designated financial accounts from the financial institution computing system;

determining, by the financial institution, an appropriate balance indicator image, symbol, or display associated with the defined one or more account balance ranges that includes the current account balance amount;

transforming, on behalf of the financial institution, the current account balance amount data into the appropriate balance indicator image, symbol, or display data;

providing, by the financial institution, the balance indicator image, symbol or display to the accessed one or more designated applications; and displaying, on an account owner computing system, the provided balance indicator image, symbol, or display through the accessed one or more designated applications.

17. The system for providing a secure syndicated balance display of claim 16, wherein;

the one or more financial accounts associated with an account owner designated for balance monitoring are selected from the group of financial accounts consisting of:
debit card accounts;
credit card accounts;
checking accounts;
savings accounts;
lines of credit;
home equity accounts; and
retirement accounts.

18. The system for providing a secure syndicated balance display of claim 16, wherein;

at least one of the unique balance indicator images, symbols, or displays is selected from the group of unique balance indicator images, symbols, or displays consisting of:

one or more graphical caricatures of one or more sizes or colors;
one or more letters of one or more sizes or colors;
one or more stars of one or more sizes or colors;
one or more codes of one or more sizes or colors;
one or more thermometers of one or more sizes or colors;
one or more sliding scales of one or more sizes or colors;
one or more animated graphical representations of one or more sizes or colors;
one or more graphical or optical images of an animal of one or more sizes or colors;
one or more graphical or optical images of an object of one or more sizes or colors;
one or more graphical or optical images of a person of one or more sizes or colors;
one or more background displays of one or more sizes or colors; and
one or more background images of one or more sizes or colors.

19. The system for providing a secure syndicated balance display of claim 16, wherein;

the account owner computing system is a mobile computing system.

20. The system for providing a secure syndicated balance display of claim 16, wherein;

the current account balance amount data for at least one of the one or more designated financial accounts is obtained from a financial management system associated with the account owner.

* * * * *